US010799991B2

(12) United States Patent
Galligan

(10) Patent No.: US 10,799,991 B2
(45) Date of Patent: Oct. 13, 2020

(54) HOLDING DEVICE

(71) Applicant: Greg Galligan, Corning, NY (US)

(72) Inventor: Greg Galligan, Corning, NY (US)

( * ) Notice: Subject to any disclaimer, the term of this patent is extended or adjusted under 35 U.S.C. 154(b) by 77 days.

(21) Appl. No.: 15/812,578

(22) Filed: Nov. 14, 2017

(65) Prior Publication Data

US 2018/0133855 A1 May 17, 2018

Related U.S. Application Data

(60) Provisional application No. 62/421,704, filed on Nov. 14, 2016.

(51) Int. Cl.
*B23Q 3/10* (2006.01)
*B25H 3/00* (2006.01)

(52) U.S. Cl.
CPC ............. *B23Q 3/105* (2013.01); *B25H 3/006* (2013.01)

(58) Field of Classification Search
CPC ................................ B24B 23/02; B24B 23/00
USPC ................................ 451/359, 442; 248/206.5
See application file for complete search history.

(56) References Cited

U.S. PATENT DOCUMENTS

| 2,888,965 | A | * | 6/1959 | Carleton | B25H 1/0078 |
| | | | | | 144/1.1 |
| 5,160,114 | A | * | 11/1992 | Livingston | B23D 59/007 |
| | | | | | 144/136.95 |
| 5,657,804 | A | * | 8/1997 | Lee | B23D 57/0076 |
| | | | | | 144/136.95 |
| 2002/0130231 | A1 | * | 9/2002 | Winnard | B25H 3/04 |
| | | | | | 248/206.5 |
| 2016/0149386 | A1 | * | 5/2016 | Stechmann | H02G 3/32 |
| | | | | | 248/68.1 |

* cited by examiner

*Primary Examiner* — George B Nguyen
(74) *Attorney, Agent, or Firm* — Timothy W. Menasco, Esq.; Harter Secrest & Emery LLP

(57) ABSTRACT

Presented is a method and apparatus for holding. The apparatus includes a base, the base operable to be fixedly attached to an opposing surface, and a head support coupled to the base, the head support being spaced from the opposing surface defining a grinder head gap, the head support having an end portion that is curved with an open top. The apparatus further includes a handle support, the handle support coupled to the base extending away from the opposing surface, the handle support having a curved portion and an open portion.

18 Claims, 3 Drawing Sheets

402: (a) forming a base, the base operable to be fixedly attached to an opposing surface; (b) forming a head support coupled to the base, the head support being spaced from the opposing surface defining an grinder head gap, the head support having an end portion that is curved with an open top; and (c) forming a handle support, the handle support coupled to the base extending away from the opposing surface, the handle support having a curved portion and an open portion

404: the method further comprising forming at least one hole in the base for affixing the base to the opposing surface

406: the method further comprising forming a plurality of steps in the head support extending between the base and the end portion

408: wherein the base, the head support, and the handle support are integral

410: wherein the base, the head support, and the handle are not integral

412: wherein a longitudinal axis of the handle support is between 45 degrees and 90 degrees relative to the opposing surface

414: the method further comprising affixing a removeable strap to the head support, the removeable strap operable to maintain a location of a tool relative to the head support portion

FIG. 4

HOLDING DEVICE

BACKGROUND OF THE INVENTION

Field of the Invention

The present disclosure provides an apparatus and method for holding. More particularly, embodiments of the present disclosure provide an apparatus and method for holding one or more tools.

Description of Related Art

There are many different types of tools used by mechanics, engineers, and handymen that can be maintained in a variety of toolboxes, toolkits, tool chests or workboxes. These boxes typically are used to organize, carry, and protect the owner's tools from damage, debris, and the elements. These boxes also provide a means for a user to more easily transport the tools from one are to another area. However, these boxes while generally able to maintain most tools fail to be able to accommodate some types of power tools along with larger instruments. Accordingly, there is a need for an improved holder or receptacle operable to maintain larger types of tools including power tools.

BRIEF SUMMARY OF THE INVENTION

In view of the foregoing, it is an object of the present disclosure to provide an apparatus and method for holding.

A first exemplary embodiment of the present disclosure provides an apparatus for holding. The apparatus includes a base, the base operable to be fixedly attached to an opposing surface, and a head support coupled to the base, the head support being spaced from the opposing surface defining a grinder head gap, the head support having an end portion that is curved with an open top. The apparatus further includes a handle support, the handle support coupled to the base extending away from the opposing surface, the handle support having a curved portion and an open portion.

A second exemplary embodiment of the present disclosure provides a method of forming. The method includes forming a base, the base operable to be fixedly attached to an opposing surface, and forming a head support coupled to the base, the head support being spaced from the opposing surface defining a grinder head gap, the head support having an end portion that is curved with an open top. The method further includes forming a handle support, the handle support coupled to the base extending away from the opposing surface, the handle support having a curved portion and an open portion.

A third exemplary embodiment of the present disclosure provides an apparatus for holding. The apparatus comprises an elongate planar element having a longitudinal axis, a distal end and a proximal end, the element comprising a U-shaped head portion at the proximal end, a substantially perpendicular step spaced apart from the U-shaped head, a base portion substantially parallel to the head portion, and a second U-shaped portion at the distal end, wherein the base portion is located between the step and the second U-shaped portion, and wherein the second U-shaped portion extends between 45°-90° relative the base portion.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

BRIEF DESCRIPTION OF THE SEVERAL VIEWS OF THE DRAWING(S)

FIG. 4 is a logic flow diagram in accordance with a method and apparatus for performing exemplary embodiments of this disclosure.

DETAILED DESCRIPTION OF THE INVENTION

Figure 1:
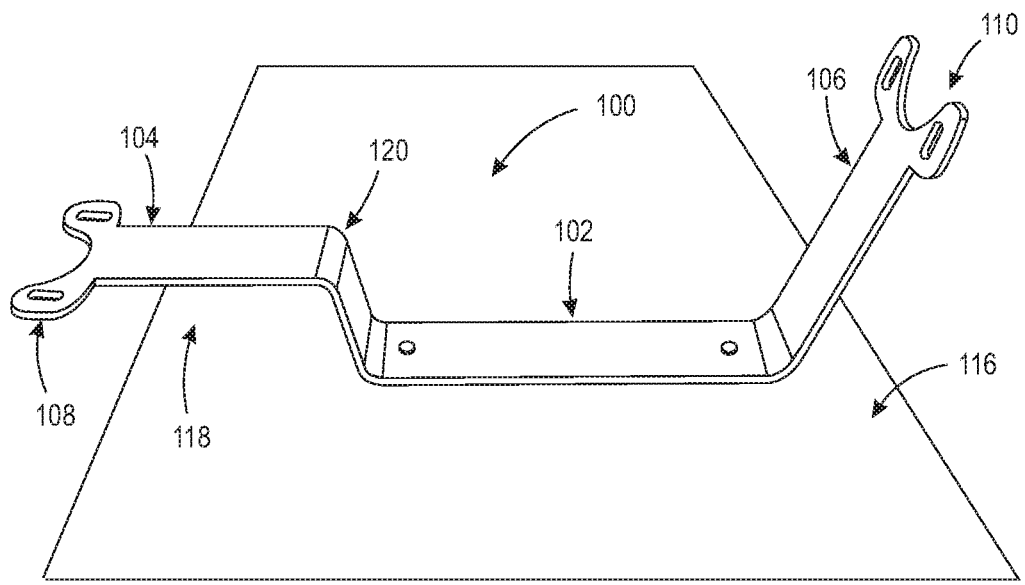
FIG. 1 is a side perspective view of an exemplary device suitable for use in practicing exemplary embodiments of this disclosure.

Embodiments of the present disclosure provide a device, apparatus, and/or holder operable to be fixedly or removeably affixed to an opposing surface (e.g., a wall, bench, or work space) such that the device can maintain or hold a power tool, such as a grinder power tool. Embodiments of the present disclosure provide a device that is operable to maintain or hold a power tool having a similar physical profile to that found in a grinder power tool.

Referring to FIGS. 1-4, shown is a side perspective view of an exemplary grinder holder 100 operable to maintain or hold a grinder. Grinder holder 100 includes a base 102, a head support 104, and a handle support 106. In one embodiment, grinder holder 100 is made of an elongate flat planar bar or element having a longitudinal axis, a proximal end and a distal end. Base 102 as shown is a planar surface operable to be fixedly or removably affixed to an opposing surface, such as a wall or work bench. However, it should be appreciated that embodiments of base 102 include a surface that is curved or shaped to correspond with the opposing surface 116 to which it is attached provided that the base 102 does not interfere with tool 114 (shown in FIG. 3). Embodiments of grinder holder 100 can be made out of metal, steel, aluminum alloy, wood, or a combination of this materials such that grinder holder 100 is operable to maintain a grinder's or power tool's weight. Base 102 can include one of more holes 112. Holes 112 are sized and are operable to interact with a screw, nail, bolt, or rivet such that base 102 can be affixed to an opposing surface 116.

Figure 2:
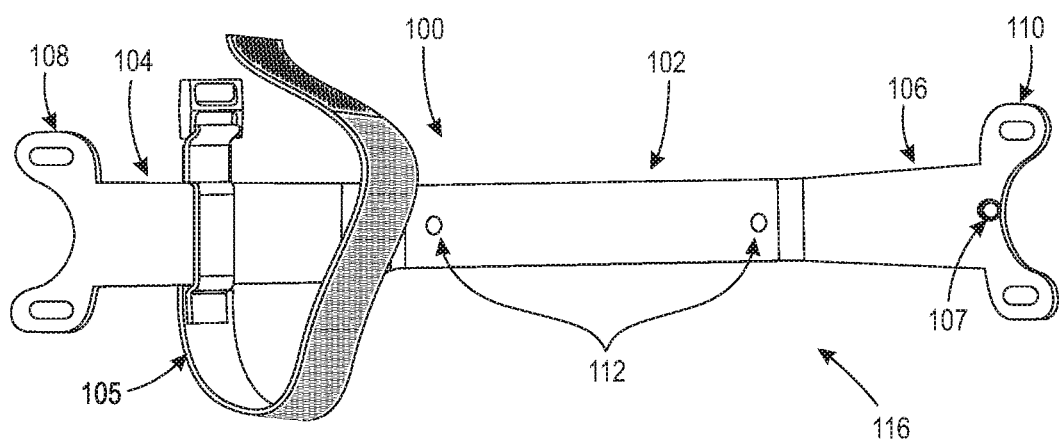
FIG. 2 is a front view of an exemplary device suitable for use in practicing exemplary embodiments of this disclosure.
Figure 3:
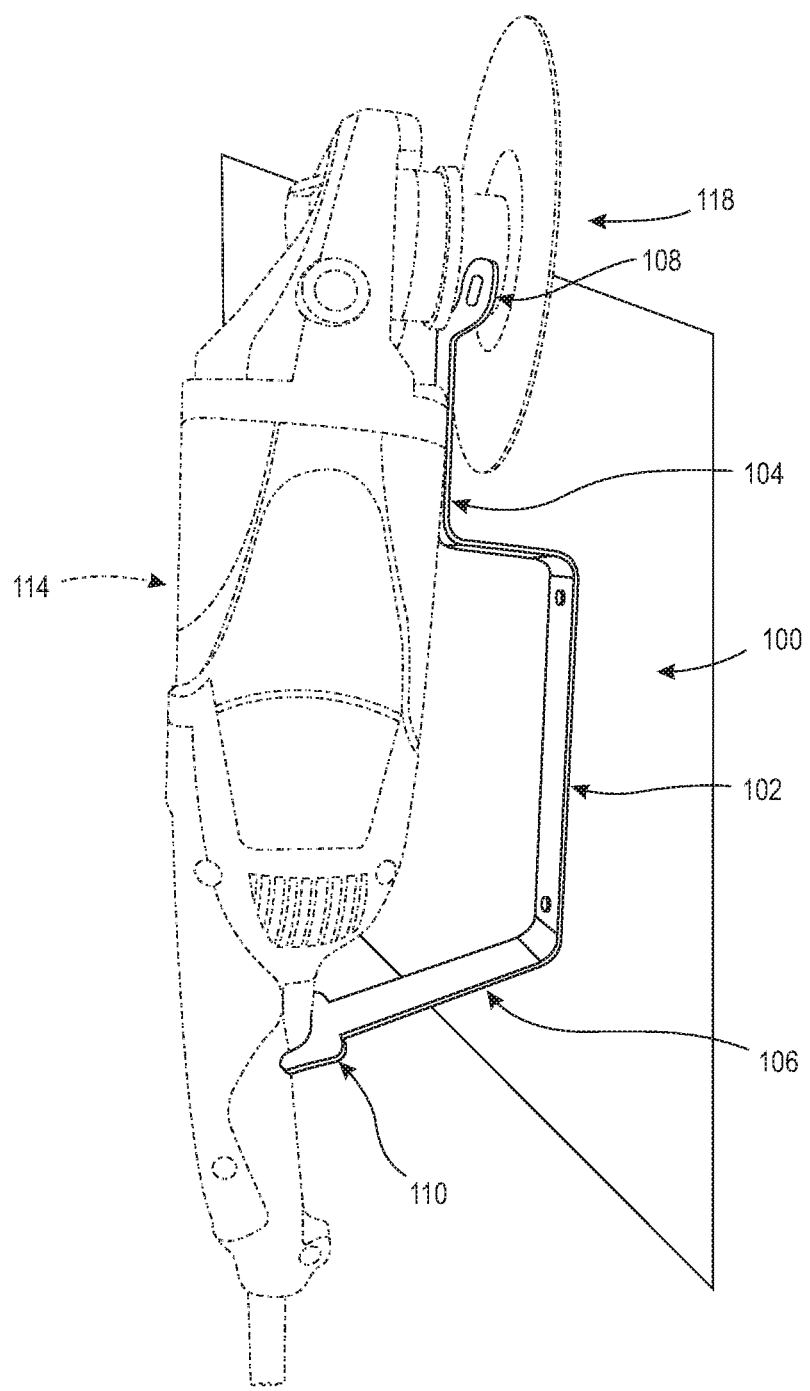
FIG. 3 is a side view of an exemplary device with a tool suitable for use in practicing exemplary embodiments of this disclosure.

Base 102 as shown in FIGS. 1-3 are integral with head support 104 and handle support 106. However, embodiments of grinder holder 100 provide that head support 104 and handle support 106 can be separate pieces that are attached to base 102. Head support 104 is coupled to or integral with base 102 such that head support 104 extends generally parallel to the opposing surface and is spaced from the opposing surface 116 to which base 102 is affixed. Embodiments include head support 104 extending along the longitudinal axis of grinder holder 100 such that head support 104 is parallel to base 102. The space from opposing surface provides a grinder head gap 118 sized to fit a grinder maintained by grinder holder 100 (shown in FIG. 3) such that the grinding element of a grinder does not rub or come into contact with opposing surface 116.

Head support 104 can include one or more steps 120 between base 102 and U-shaped element 108. In one embodiment head support 104 is U-shaped and is located at the proximal end of grinder holder 100. In this embodiment, the U-shaped head support 104 (or portion) is spaced apart from a substantially perpendicular step. In an embodiment, head support 104 includes a curved or U-shaped open top element 108 operable to maintain a location of the head or grinding portion of a grinder. In one embodiment, head support 104 includes a removeable strap 105 that is operable to maintain a grinder 114 within grinder holder 100. Removeable strap 105 can maintain the location of grinder 114 through the use of Velcro, snaps, buttons, or buckles.

Handle support 106 is coupled to base 102 and extends away from opposing surface 116. Handle support 106 as shown in FIGS. 1-3 are integral with base 102, but embodiments of handle support 106 can be separate attachable elements. Embodiments of handle support 106 are located at the distal end of elongate planar element of grinder holder 100. Embodiments of handle support 106 provide that the longitudinal axis of the handle support 106 is between 45 degrees and 90 degrees relative to the opposing surface 116. Handle support 106 includes a curved or U-shaped end portion 110 operably sized to maintain the handle of a grinder 114 within grinder holder 100. Embodiments of handle support 106 include a magnetic element operable to aid in maintaining a location of magnetic objects relative to handle support 106. Handle support 106 can include one or more magnets 107 located on or within U-shaped portion 110. Magnet 107 is operable to attract magnetically sensitive objects to handle support 106.

In practice, embodiments of grinder holder 100 are operable to maintain a location of a grinder 114 (shown in FIG. 3). Grinder holder 100 is operable to maintain a grinder 114 in the upright position with the grinder facing up and at different angles between 45° to 90°. Embodiments of grinder holder 100 have a head support 104 operable to maintain the weight of a grinder 114. Embodiments of grinder holder 100 have a handle support 106 operable to maintain a relative location of a grinder 114 handle. Embodiments of handle support 106 substantially prevent a grinder 114 handle from freely swinging while the head of grinder 114 is maintained in the head support 104.

Reference is now made to FIG. 4, which depicts an exemplary logic flow diagram in accordance with a method of forming an exemplary holding device. The process begins at block 402 which states (a) forming a base, the base operable to be fixedly attached to an opposing surface; (b) forming a head support coupled to the base, the head support being spaced from the opposing surface defining an grinder head gap, the head support having an end portion that is curved with an open top; and (c) forming a handle support, the handle support coupled to the base extending away from the opposing surface, the handle support having a curved portion and an open portion. Then block 404 indicates the method further comprising forming at least one hole in the base for affixing the base to the opposing surface.

Following block 404, block 406 states the method further comprising forming a plurality of steps in the head support extending between the base and the end portion. Block 408 relates to wherein the base, the head support, and the handle support are integral. Block 410 then states wherein the base, the head support, and the handle are not integral. Block 412 indicates wherein a longitudinal axis of the handle support is between 45 degrees and 90 degrees relative to the opposing surface. Finally, block 414 states the method further comprising affixing a removeable strap to the head support, the removeable strap operable to maintain a location of a tool relative to the head support portion.

The logic diagram of FIG. 4 may be considered to illustrate the operation of a method. The logic diagram of FIG. 4 may also be considered a specific manner in which components of a device are formed or created, whether such device is a grinder holder of other type of power tool holder.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An apparatus for holding, the apparatus comprising:
   (a) a base, the base operable to be fixedly attached to an opposing surface;
   (b) a head support coupled to the base, the head support being spaced from the opposing surface defining an grinder head gap, the head support having an end portion that is curved with an open top, wherein the head support comprises a plurality of steps extending between the base and the end portion; and
   (c) a handle support, the handle support coupled to the base extending away from the opposing surface, the handle support having a curved portion and an open portion.

2. The apparatus according to claim 1, wherein the base includes at least one hole for affixing the base to the opposing surface.

3. The apparatus according to claim 1, wherein the base is operable to be removeably affixed to the opposing surface by at least one of clamps, clasps, snaps, Velcro, nails, screws, or rivets.

4. The apparatus according to claim 1, wherein the base, the head support, and the handle support are integral.

5. The apparatus according to claim 1, wherein the base, the head support, and the handle support are not integral.

6. The apparatus according to claim 1, wherein a longitudinal axis of the handle support is between 45 degrees and 90 degrees relative to the opposing surface.

7. The apparatus according to claim 1, the apparatus further comprising a removeable strap operable to maintain a location of a tool relative to the head support portion.

8. The apparatus according to claim 1, wherein the head support portion comprises at least one of a clasp, clamp, or connector operable to removeably affix the head support to a tool.

9. A method of forming, the method comprising:
   (a) forming a base, the base operable to be fixedly attached to an opposing surface;
   (b) forming a head support coupled to the base, the head support being spaced from the opposing surface defining an grinder head gap, the head support having an end portion that is curved with an open top;
   (c) forming a plurality of steps in the head support extending between the base and the end portion; and
   (d) forming a handle support, the handle support coupled to the base extending away from the opposing surface, the handle support having a curved portion and an open portion.

10. The method according to claim 9, the method further comprising forming at least one hole in the base for affixing the base to the opposing surface.

11. The method according to claim 9, wherein the base, the head support, and the handle support are integral.

12. The method according to claim 9, wherein the base, the head support, and the handle support are not integral.

13. The method according to claim 9, wherein a longitudinal axis of the handle support is between 45 degrees and 90 degrees relative to the opposing surface.

14. The method according to claim 9, the method further comprising affixing a removeable strap to the head support, the removeable strap operable to maintain a location of a tool relative to the head support portion.

15. An apparatus for holding, the apparatus comprising:
   an elongate planar element having a longitudinal axis, a distal end and a proximal end,
   the planar element comprising a U-shaped head portion at the proximal end, a substantially perpendicular step spaced apart from the U-shaped head portion,
   a base portion substantially parallel to the U-shaped head portion, and
   a second U-shaped portion at the distal end, wherein the base portion is located between the step and the second U-shaped portion, and
   wherein the second U-shaped portion extends between 45°-90° relative to the base portion.

16. The apparatus according to claim 15, wherein the base portion comprises at least two holes for affixing the base to the opposing surface.

17. The apparatus according to claim 15, wherein the second U-shaped portion comprises a magnet operable to substantially maintain a location of a magnetic object.

18. The apparatus according to claim 15, wherein the elongate planar element, the base portion, the head portion, step and the second U-shaped portion are integral.

\* \* \* \* \*